May 11, 1965

B. McCOLLUM 3,182,743

METHOD OF SEISMIC EXPLORATION

Filed Jan. 13, 1960

Burton McCollum
INVENTOR.

BY Bertram H. Mann
ATTORNEY

Burton McCollum
INVENTOR.

BY Bertram H. Mann
ATTORNEY

May 11, 1965

B. McCOLLUM

3,182,743

METHOD OF SEISMIC EXPLORATION

Filed Jan. 13, 1960

Burton McCollum
INVENTOR.

BY Bertram H. Mann

ATTORNEY

United States Patent Office 3,182,743
Patented May 11, 1965

3,182,743
METHOD OF SEISMIC EXPLORATION
Burton McCollum, Houston, Tex.; P. R. Rowe and Bank of the Southwest National Association, Houston, Tex., executors of Burton McCollum, deceased
Filed Jan. 13, 1960, Ser. No. 2,255
4 Claims. (Cl. 181—.5)

This invention relates to the art of subsurface exploration by means of the seismograph, and particularly by means of the reflection seismograph.

The invention is particularly useful in all areas where conventional methods yield records of unsatisfactory quality.

In general, it may be said that two basic types of subsurface conditions give rise to unsatisfactory records. One of these conditions is encountered in those areas in which the near surface formations are of such character that seismic waves, when generated therein, do not damp out quickly, the situation being analogous to a large auditorium in which the acoustics are very poor. When a seismic wave is generated near the surface, as is usually the case, the waves travel downward and are reflected from progressively deeper horizons, the reflected events which it is desired to record becoming progressively weaker as the depths of the reflecting horizons increase.

At the same time, other seismic components travel outwardly in all directions and are multiply reflected from innumerable acoustical boundaries caused by discontinuities and variations in acoustic properties of the formations. In areas where the near surface formations are of poor elastic character, these horizontal reverberations are rapidly damped out and virtually disappear before the reflected events from the relatively deep boundaries arrive at the detecting station. Under such conditions these horizontal reverberations do little harm, and good records may be obtained. If, however, the near surface formations embrace materials of good elastic quality such as hard rocks, these horizontal reverberations will often persist with great intensity for long periods and will often completely obscure the relatively weak reflected events. This gives rise to what are often called "poor record" or "no record" areas.

The other basic difficulty mentioned above results from the fact that there often exist numerous reflecting horizons so close together that the individual reflected events from the several horizons overlap, giving rise to complex composite events that are difficult or impossible to interpret. I have found that these difficulties can be largely avoided by using very short wave lengths, and this constitutes one of the important elements of my invention. My invention consists broadly in methods and apparatus, and combinations of these, whereby I am able to make practical use of very short wave lengths. These methods embrace new and practical techniques for generating, radiating and recording of seismic waves having important predetermined characteristics, and for the subsequent processing of the records in order to reveal the greatest possible amount of information.

The main object of my invention is to provide novel means and method for producing and processing seismic records in such manner that it is possible to derive much more definite information regarding subsurface structures than it is possible to obtain by conventional methods.

Another object is to provide novel method and means to suppress disturbing waves, such as persistent, horizontal reverberations, and make the reflected waves stand out clearly on the resulting record so that their presence and time of arrival can be accurately determined.

Another object is to provide novel means and method for providing records of reflected seismic events displaying better resolution between events reflected from closely spaced horizons than has been possible heretofore.

Another object is to materially improve the signal to noise ratio in seismic prospecting records.

Still another object is to provide a novel acoustic coupling between a seismic wave radiator and the earth.

Another object is to provide novel means and method for radiating through the earth seismic waves of very short wave lengths.

Another object is to provide novel means and method of radiating truncated wave trains, particularly those consisting of waves of exceptionally short wave lengths.

Another object is to provide novel, simplified means for more forcefully radiating seismic waves than has been heretofore possible.

Another object is to provide means for utilizing the Fourier principle in obtaining better resolution of seismic prospecting records.

Another object is to provide novel means for obtaining close synchronization between the wave radiator and recording apparatus.

My invention is fully described in the annexed specification, reference being made to the accompanying drawings in which.

The advantages to be derived from the use of very brief seismic events in exploring complex subsurface geology are well recognized, but heretofore no method of utilizing such short events has found practical application. In the past it has been standard practice to generate a seismic wave in the form of a pulse either by firing a charge of explosive or by the dropping of a weight. When seismic waves are generated by these means there is virtually no adequate control over the duration of seismic events that are subsequently detected and recorded. In general, the duration of seismic pulses so generated is determined chiefly by three factors, viz., (1) the magnitude of the generating impulse, the stronger the impulse the greater the duration; (2) the elastic properties of the earth immediately surrounding the zone in which the pulse is generated; and (3) the time elapsing between the generation of the pulse and its recording. It has long been known that reflected pulses coming from deep horizons are of longer duration than reflected events from shallow horizons although both are derived from the same source. This effect is clearly revealed in reflected events resulting from the firing of a detonating charge where the actual detonation has a duration of only a fraction of a millisecond, but the resulting reflected events coming from considerable depths may have durations in the range from twenty-five to fifty milliseconds depending on the distances traveled and on the elastic properties of the medium. Herefrom it follows that it is useless to try to secure events of very short duration by simply generating short seismic pulses at the source. I have found, however, that by using truncated wave trains having a duration of a suitable number of wave lengths, and having unique properties as described later, it is possible to derive from these waves residual events of much shorter duration than can be obtained through the generating of pulses. Superficially, it would appear to be illogical to attempt to shorten the duration of a seismic event by substituting a train of waves for a single pulse, since the use of a wave train involves the use of a considerable number of wave lengths whereas a typical seismic pulse rarely embraces more than from one and a half to two wave lengths. However, as will presently be shown, I have devised practical means whereby relatively long wave trains can be used for carrying the seismic energy, and these wave trains can be subsequently processed in such manner as to yield a significant event of much shorter duration than the original carrier wave trains, and which reveals the presence and precise time of arrival of the individual reflected events even though such events are derived from reflecting horizons too close together to be resolved by conventional means.

In a practical embodiment of my invention, I prefer to use truncated trains of waves having wave lengths in the range between one and ten milliseconds. The energy that can be radiated at such frequencies under ordinary practical conditions is small compared to the energy that can be put into the ground by the customary method of firing a charge of explosive or by dropping a weight. To a considerable degree, this can be compensated for by using sharply tuned filters to eliminate most noises except those having a frequency close to that of the wave train. It is well known that conventional filters are much more effective when used with wave trains than when only a conventional seismic pulse is involved. Further, by using well known techniques of integrating a large number of sequential signals and by using a large number of detectors properly dispersed over a suitable area, great improvement in signal-noise ratios can be obtained. I have also developed much more powerful seismic radiating devices than any heretofore used and further, the methods of utilizing wave trains hereinafter disclosed also contribute to the improvement in signal-noise ratio. By combining all of these means, signals of adequate strength can readily be obtained.

Under some conditions these truncated wave trains can be used in their natural form without modification. This is true in areas where, due to favorable acoustic properties of the earth, very short wave lengths, say of the order of one millisecond or less, can be used. In this case a wave train embracing, say, five cycles, would have an overall duration of not over five milliseconds, which is short enough for most purposes. However, in most areas it is necessary to use longer wave lengths to secure a lower rate of attenuation of signal strength due to absorption in formations of poor acoustic properties. In such cases the wave lengths and number of cycles needed for best overall results will usually result in wave trains having durations in the range from fifty to one hundred milliseconds, which are much too long to permit the resolution of important fine structure or the mapping of stratigraphic traps. Therefore, truncated wave trains, per se, do not afford a satisfactory solution of the problem of producing seismic signals of very short duration. In order to accomplish this objective further techniques are necessary. I have found that by generating and recording groups of truncated wave trains possessing unique and essential characteristics designed for this specific purpose, I can then process these trains in such manner that they will yield significant indicators of the presence and precise time of arrival of reflected events, the said indicators having a much shorter duration than the wave trains from which they are derived. The generating and recording of wave trains having the particular characteristics required, and the methods of processing the same to achieve the desired results, constitute essential elements of my invention. These elements are described in sequence below.

Figure 1:
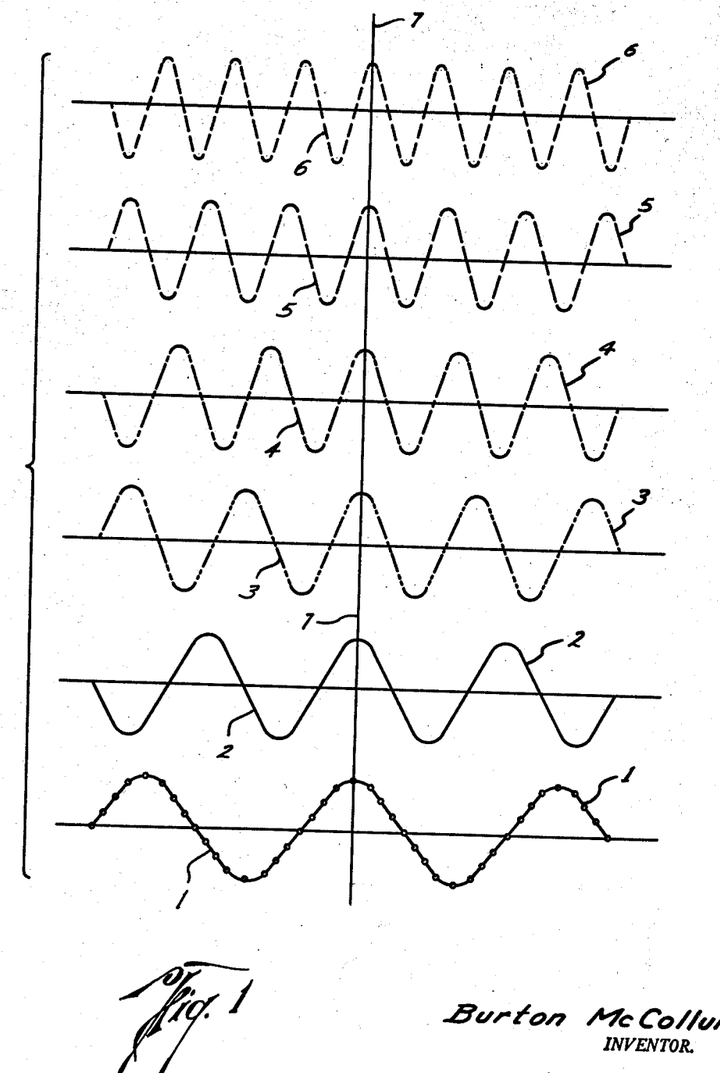
FIG. 1 illustrates graphically a set of seismic signals of the type that forms one of the bases of my invention.

In a practical embodiment of my invention, I generate, radiate, and record a group of truncated wave trains embracing a plurality of frequencies of the general type shown in FIG. 1. Each component train of this group, such as curve 1 for example, will have a fixed frequency that will be held constant to a very high degree of precision, and the frequencies of the several components of the group will bear a very definite relationship to each other, as explained later. The actual values of the fixed frequencies may embrace a wide range, but for practical reasons they will usually be between a lower limit of about fifty cycles per second, and an upper limit of perhaps one thousand cycles per second.

For reasons pointed out above, it will usually be necessary to radiate, record, and integrate a large number of repetitions of each of these wave trains in order to build up the signal strength in relation to noise to a desired degree. Each of the individual wave trains shown in FIG. 1 is to be regarded as such a composite of a large number of sequentially radiated wave trains, all of the same fixed frequency and of approximately the same amplitude. These individual wave trains can all be radiated simultaneously, or separately and sequentially. For greater simplification in exposition it will be here assumed that the trains are radiated sequentially. After the first of these composites has been made and stored for future processing, a second series, having also a very constant frequency, different from the frequency of the first train, is generated, and their composite recorded as shown at 2 in FIG. 1. This process is repeated, always with a different frequency, until the desired number of composite wave trains has been recorded. In FIG. 1 there are shown, for illustrative purposes, records of six wave trains, all of different frequencies but of approximately the same amplitude and train length. The wave trains shown are illustrative only, and imply no limitations as to the duration of the wave trains. There is one all important relationship existing between these several wave train records, which is that, when aligned as in FIG. 1 they must all be substantially in phase on a common line, as 7, which line must be near a wave peak in each train. In order to avoid objectionable transients, it is desirable although not essential that each wave train record begin and end at or near a point of zero amplitude as indicated in FIG. 1. In the general case illustrated in FIG. 1, this requires that the timing of the several wave trains and their records be very carefully made. This subject is treated hereafter in greater detail.

Figure 2:
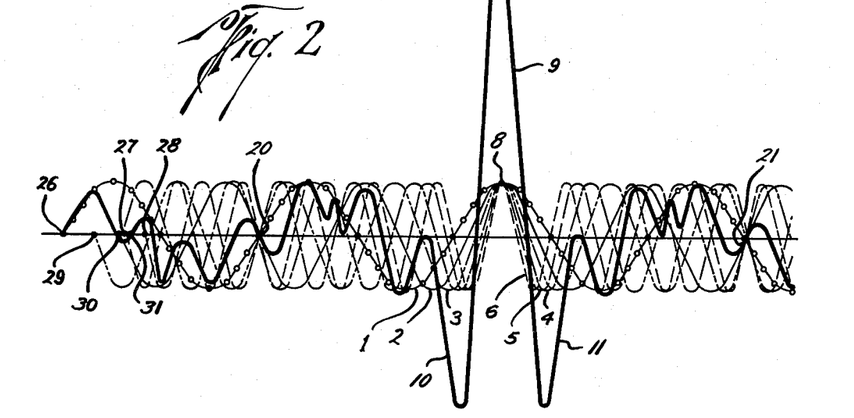
FIG. 2 graphically represents the signals shown in FIG. 1 superposed and composited.

In order to more fully illustrate the principle of my invention, the several wave trains of FIG. 1 are shown superposed in FIG. 2. It will be seen that the several trains are in phase and therefore completely cumulative in a composite only at the common point 8. At all points displaced from point 8 by more than about one of the shorter wave lengths, the phase positions, although definitely related, are such as to cause mutual cancellation instead of cumulation. If, now, we make a composite or integration of all six of the trains in FIG. 2, the result will be the heavy line 26, 20, 10, 9, 11, 21. This composite is seen to have an outstanding or peak event of much greater amplitude and, in its principal aspects, of much shorter duration than the wave trains from which it is derived. Because of the outstanding amplitude of the central portion 9 of this composite, we may ignore the small lateral portions, leaving a significant residual pulse having a duration determined by the secondary, inverted prominences 10 and 11, this duration being but a small fraction of the duration of the wave trains from which the residual pulse is derived. The relatively long wave trains 1 to 6 do not appear on the final, integrated record, having been replaced by the mentioned composite residual trace 26, 20, 10, etc. The residual peak pulse 9 becomes, in effect, a sharp pointer directed at a definite part of the reflected wave trains, thereby giving a precise indication of the time of arrival of the reflected wave.

Figure 3A:
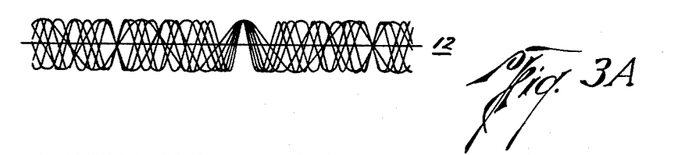
FIGS. 3A and 3B illustrate graphically overlapping sets of superposed wave train traces, as reflected from closely spaced horizons.
Figure 3B:
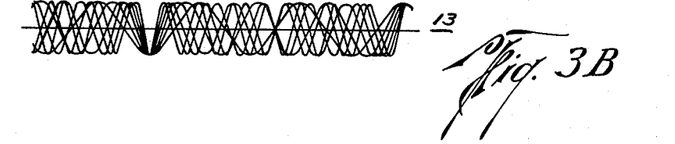
Figure 4:
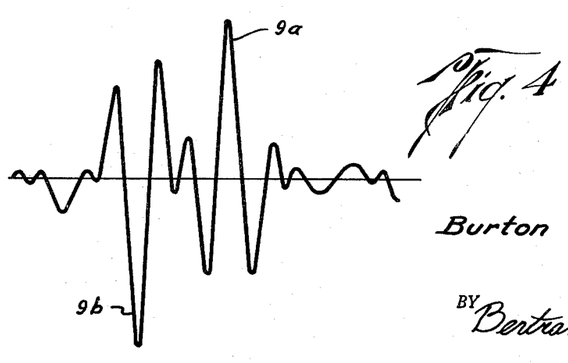
FIG. 4 is a composite of the overlapping wave trains of FIGS. 3A and 3B.

One of the objectives outlined earlier in this specification is the mapping of a plurality of reflecting horizons very close together, such that with conventional pulse technique the reflected events, usually of thirty to fifty milliseconds duration, will overlap. As pointed out above, the duration of the wave trains here contemplated may range up to a hundred milliseconds or more, the reason for this being that it makes possible a very large resonant build-up of signal strength by sharp tuning, while random noise is thereby greatly reduced. It is pertinent here to inquire whether this long duration of the wave trains used involves the same handicap of overlapping events as is encountered in the use of conventional pulses. Careful analysis shows that this is not the case. It is true, of course, that these relatively long wave trains reflected from horizons close together will usually overlap to a considerable degree. Since the residual traces are obtained by algebraic integration of the several wave trains of a group, the composite of two or more overlapping groups of wave trains will be the same as the composites of the several residual or composite traces. It follows, therefore, that the duration of the more prominent portions of the residual traces determines whether there will be a clear resolution of closely associated reflecting horizons. In practice, the duration of these residual pulses is of the order of from three to eight milliseconds, although derived from wave trains having a duration many times greater. FIGURES 3A, 3B, and 4 illustrate a typical case in which two reflecting horizons are so close together that the groups of wave trains, 12 and 13, reflected from them, show extensive overlap. In FIGS. 3A and 3B, the two groups of wave trains are shown on separate traces for clarity of exposition to show the extent of the overlap. In any actual case only the composite of the two groups will appear on the final record, the individual carrier trains being practically eliminated by algebraic integration, as above described, the degree of elimination of the carrier trains of each group at the sides of the preserved cumulative marker depending upon the relative amplitudes of the detected and filtered waves as recorded. The final composite, as it actually appears on the record, is shown in FIG. 4. It will here be seen that while there is extensive overlapping of the carrier wave trains, the overlap here shown being about 80%, the residual pulses 9a and 9b stand out clearly although the reflecting horizons which produce them are only a few milliseconds of wave travel apart. This shows that overlapping of the wave trains does not interfere with clear resolution of the fine structure of the subsurface.

The use of a group of wave trains of different frequency, as above described, yields another important advantage. If a single truncated wave train be used, and if reflections occur from boundaries so close together that the trains overlap, and if, as often will happen, the overlapping portions of the trains are approximately opposite in phase, there will be mutual destruction of the overlapping portions. However, when a plurality of trains of different frequencies is used only one of the trains of the group will be subject to this hazard, and the composite of the other members of the group will reveal the reflected event with only a slight loss of amplitude and virtually no shift in phase.

Figures 5, 6:
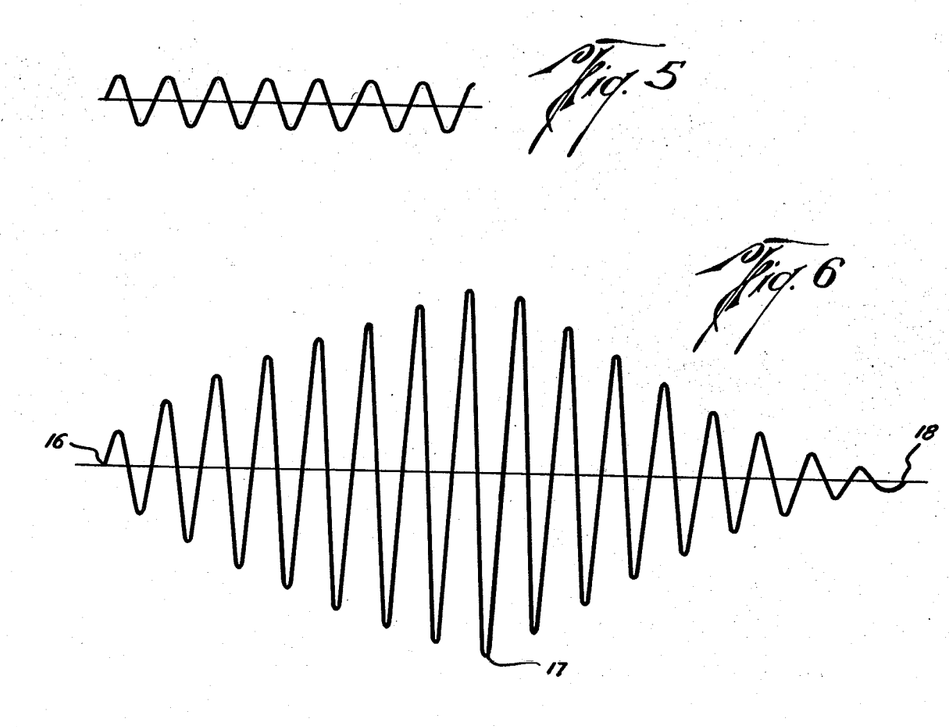
FIG. 5 illustrates a typical sine wave train.
FIG. 6 illustrates the wave train of FIG. 5 as recorded after passing through a resonant filter.

In the illustrations hereinabove used, the residual pulse (prominence) is shown to be near the center of the group of truncated wave trains. However, in practice this condition is not only not necessary, but actually often undesirable as far as the radiated trains are concerned. As pointed out above, one of the main reasons for using prolonged wave trains is that they make it possible to greatly build up the signal energy by the use of resonant filters. If we detect a wave train of uniform amplitude as shown in FIG. 5, and record this signal without resonant filters, the recorded signal will appear identical with the detected signal from which it is derived. However, if we pass the detected signal through a resonant filter of the same frequency as the signal, there will be a progressive build-up in amplitude, as illustrated in FIG. 6, this build-up reaching a maximum at some point 17, depending on the resonant characteristic of the filter. Thus, if we use a truncated wave train having a duration equal to that portion between the start of the signal at 16 and the maximum resonant point 17 we will secure the maximum possible benefit from the resonant build-up attainable from that particular filter, and any further extension of the length of the truncated wave train radiated will be useless. In practice I prefer to determine the duration of the radiated wave trains by this criterion. In that case the actual wave train as detected will be like the sine wave shown in FIG. 5, but as recorded after resonant build-up it will be like the event shown in FIG. 6. The first part of the train between 16 and 17 will be the period of resonant build-up, and the later part from 17 to 18 the period of exponential decay. When a plurality of such tapered wave trains of different frequency are made into a composite as described above, we get the same residual pulse as before, the lateral tapered portions virtually disappearing, but the amplitude of the peak of the residual pulse will be the composite of the resonant peak values near the point 17 and therefore of greatly enhanced amplitude. Herefrom it will be seen that the most desirable results are obtained when the residual pulse is formed at or near the end of the wave trains as detected, this being the point of maximum resonant build-up.

In generating a plurality of wave trains of differing frequencies for achieving the objectives above outlined, precise timing of the several trains is essential. Since, as pointed out above, we will usually need to make a composite of many repetitions of each of the several trains, the starting of the train trace must be always at a precise point on the recorder drum. This can easily be accomplished by triggering the radiation by a device associated with the drum, and designed to function only at a particular point of the drum rotation. Furthermore, successive wave trains of the same frequency must be always in phase with each other. This requires an interlock between the phase position of the drum and that of the cyclic forces that supply power to activate the seismic radiator. This can be accomplished by always maintaining a precise phase relationship between recording drum and the actuating forces, as described later.

After having recorded a desired number of wave trains of the first frequency, we have the problem of timing the next and subsequent groups of trains of different frequencies so as to bring about the proper phase relationships of composited wave trains above described. To generate these different frequencies we may use a plurality of alternators, all running at different speeds, to give the proper frequency. Most of the time the relative phase positions of these several alternators will have a complex diversity, but it is essential that they all return to a definite and predetermined phase relationship at the particular point of the recorder drum rotation at which the signals are triggered. It is therefore necessary that the alternator phase relationships be cyclic and that the cycle be definitely related to the period of rotation of the drum. It can be shown that this condition can be realized by selecting frequencies for the several wave trains so that the group forms a segment of a Fourier series having a period that is an exact submultiple of the period of the recorder drum. If this combination of wave trains were continued indefinitely there would be a periodic recurrence of identical events. This recurrent phenomenon is hereinafter referred to as the Fourier cycle. When the group of wave trains meets this specification, they take the typical form shown in FIGS. 7 and 8, which, for illustrating essential aspects of the problem, are extended to embrace substantially two full Fourier cycles, corresponding to the case where the recorded signal is continued for this two-cycle period. It is seen that in this particular illustration all trains have common zero points such as 20 and 21 (FIGS. 2 and 7), which are separated by a time interval equal to one-half the period of the Fourier cycle. The period of the Fourier cycle can be given any desired value by a proper choice of frequencies for the several wave trains of a group, subject to conditions set out elsewhere in this specification. One important consideration in fixing the duration of the Fourier cycle is that the detected wave trains which create it must be long enough to permit the maximum possible resonant build-up of signal strength in the filters. It is thus dependent to a degree on the characteristics of the resonant filters used.

Figure 7:
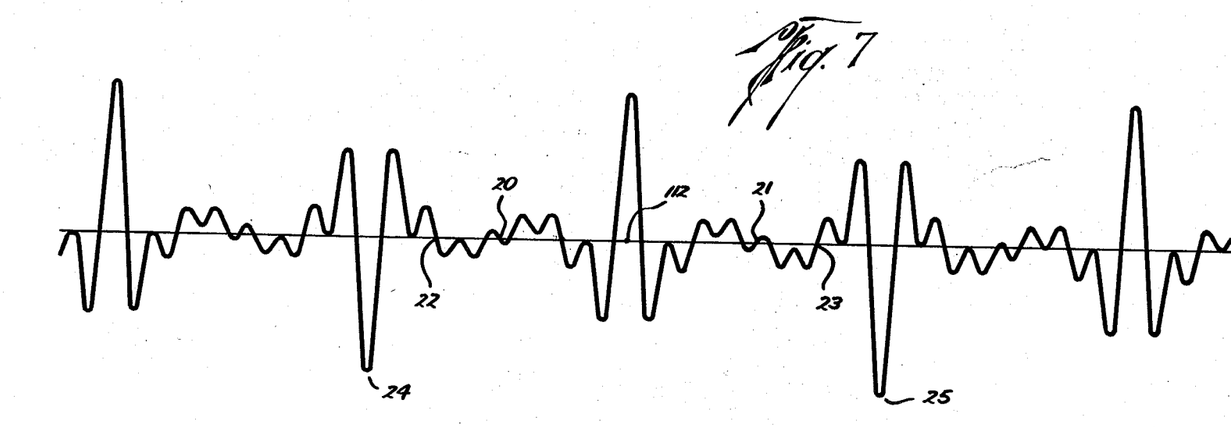
FIG. 7 illustrates a typical trace resulting from the use of one particular type of arithmetic progression in forming a wave group in accordance with my invention.

From FIG. 7 it will be seen that, in the case illustrated, if the wave trains as recorded be made longer than the period of the Fourier cycle there will appear on the record a plurality of residual pulses for each reflection, which is very undesirable. To avoid this it is necessary to limit the duration of the wave train record to somewhat less than the period of the Fourier cycle. Thus, for example, the recorded wave trains should be restricted to the zone between points 22 and 23, which are just far enough removed from the negative phase coincidences 24 and 25 so that no part of these will appear in the record. As a rule the length of the recorded wave trains should be not over 90 percent of the Fourier cycle. However, if we utilize the resonant build-up of filtered waves as illustrated in FIG. 6, the duration of the detected wave train must be restricted to about half of this figure to allow time for exponential decay so as to avoid the appearance of a residual pulse from the events 24 and 25. Thus, in the case illustrated, it is necessary to restrict the duration of the detected wave train to slightly less than half of the period of the Fourier cycle, i.e., between points as 22, 112. If, therefore, we determine that we need for resonant build-up a wave train having a duration of 70 milliseconds, the estimated period of the Fourier cycle would be slightly more than twice this, or about 150 milliseconds, but this figure would have to be checked with the period of the recorder to determine whether it could be used. For example, we assume that the period of the recorder is 4000 milliseconds, and dividing this by 150 we get the figure 26⅔. This not being an integer, the exact conditions for triggering sequential radiations would not recur each cycle of the recording means. In fact, it can easily be shown that proper phase relationships for triggering sequential radiations would recur only once every eighty periods of the Fourier cycle, or once every third revolution of the recorder. However, if we make the period of the Fourier cycle 166⅓ seconds we find that this is exactly ¹⁄₂₄ of the period of the recorder so that the exact conditions for triggering sequential radiations recur each complete cycle of the recorder, and is therefore a permissible value. In order to derive the possible periods of the Fourier cycle, we divide the period of the recorder by any integer. This gives, theoretically, a large number of usable periods, but practical considerations limit the choice to somewhere between the maximum of the recorder period and the minimum time necessary to give the desired resonant build-up of the signal. In general, I prefer to use the smallest period that meets this latter condition. Under most practical conditions this will mean a period of the Fourier cycle of a minimum of about twenty milliseconds to a maximum of around 250 milliseconds. The upper limit is determined in large measure by the fact that the amount of energy radiated is proportioned to the duration of the radiated wave train so that an unnecessarily long period requires heavier and more expensive equipment than would otherwise be required.

We will now consider how to choose the frequencies of any group of wave trains for any chosen period of the Fourier cycle so as to assure the proper timing of the sequential radiations. In order to determine a suitable group of frequencies for a practical application we first determine arbitrarily, through prior knowledge and experience, the duration of a group of wave trains that will be great enough to permit the desired resonance build-up of detected and filtered trains. In general, this will depend on the elastic properties of the subsurface and on the depth from which it is desired to secure reflections. We then choose a period for the Fourier cycle that will meet the conditions set out above. Let the period of the Fourier cycle be T; $N_n$ the number of cycles in any particular wave train of the group; and $L_n$ the wave length in seconds. Then for the several members of the train 1, 2, 3, ... n, etc., of the group, we will have:

$$N_1L_1 = N_2L_2 = N_3L_3 = N_nL_n = T \quad (1)$$

$$\therefore L_n = \frac{T}{N_n} \quad (2)$$

The frequency of this train $$f_n = \frac{1}{L_n} = \frac{N_n}{T}$$

If $N_1$ be the number of cycles per period T of the lowest or base frequency of the group, we will have:

$$N_n = N_1 + (n-1).x \quad (3)$$

where $x$ is the frequency difference between the sequential wave trains in the arithmetical series and $N_1$ and $x$ are both integers.

$$\therefore f_n = \frac{1}{T}[N_1 + (n-1)x] \quad (4)$$

By way of clarifying the significance of Equation 4, it should be explained that in general there will be a plurality of values of N for any group of frequencies. For practical purposes, I prefer to use as the value of $N_1$ in Equation 4 a figure given by the equation $$N_1 = \frac{f_1}{k}$$

where $k$ is the greatest common factor of the group of frequencies chosen for the Fourier function.

After determining T as an exact submultiple of the period of the recorder we can then assign, in the light of prior experience, more or less arbitrary values to $N_1$ and $x$, subject to the limitation that they both must be integers, as can be shown by an analysis of Equation 4. A further analysis of Equation 4 shows that if $x$ be an even integer, the Fourier cycle will be of the type illustrated in FIG. 7, in which the residual pulses are alternately positive and negative, each period of the cycle embracing both a positive and a negative pulse, thus giving two outstanding events in each period. If, however, $x$ be an odd integer, the Fourier Cycle will have the general character illustrated in FIG. 8. Here it will be seen that all prominent negative events disappear with the result that there is only one outstanding event in each period. I prefer this latter type, since for any given period of the cycle there will be about twice as much time for resonant build-up of the signal as there will be in the type shown in FIG. 7. In other words, with the Fourier cycle of FIG. 8 the detected trains may extend nearly a full cycle, i.e. between points such as 22'–112 of FIG. 8. This is substantially twice the permissible length of detected wave trains derived by using an even value of $x$, as in FIG. 7.

Figure 8:
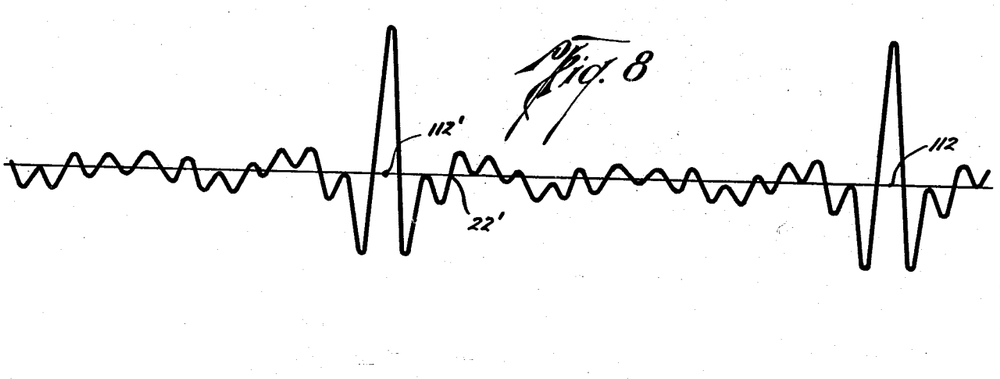
FIG. 8 illustrates a composite trace, as in FIG. 7, but using a different arithmetic progression in forming the wave group.

In general, it is important, in order to obtain the preferred type of Fourier cycle illustrated in FIG. 8, that the group of wave trains used contain an equal number of odd and even values of N.

In radiating a group of signals as described above, we may start the radiation at the common zero point 20 of FIG. 2. However, to do this imposes an unnecessary restriction on the length of the wave train that can be used for resonant build-up of the signal. As explained above, time must be allowed not only for resonant build-up, but also for exponential decay of the resonant signal so as to avoid recording more than one residual pulse for each reflected wave train. We can increase the time available for this by timing the beginning of the wave trains at an earlier time than the zero point 20. If we follow the individual curves (FIG. 2) backward from the point 20 to points a little short of the next preceding point of common peak coincidence we find, of course, that all of the trains pass through a zero value at different times, as at 26, 27, 28, 29, 30, and 31. However, these points are all definitely related, in time, to the common zero point 20, and recur precisely at the same points in each period of the Fourier cycle. By timing the starting of the trains at these points instead of the common zero point 20, we will have a substantially longer time for resonant build-up of the signal than we would have if we started the trains at the common zero point 20. This can be accomplished without handicap by adjusting the timing controls once for all at the desired relative times. Once these are established, the cyclic patern of each train is repeated at the same point in each succeeding Fourier cycle and, therefore, in view of the conditions imposed above, at each zero point of the revolution of the recorder drum. Therefore, the radiated signals will always give the desired Fourier pattern illustrated in FIG. 2. This mater is given further condsideration later in the discussion of means and methods of controlling the speed and phase position of the recorder.

Radiator

We now come to the problem of generating and radiating groups of seismic wave trains that meet the specifications set out above. There will first be described the means and methods whereby individual wave trains can be generated and radiated, after which the means of generating and radiating a plurality of wave trains of the required frequency and phase relationships will be disclosed.

In any practical embodiment of my invention the individual truncated wave trains may be generated by any of numerous possible methods comprising essentially a mechanical vibrating member in close acoustic coupling with the ground. For my purposes, however, the choice is very limited. Three requirements are outstanding: (1) the radiator must be capable of radiating a very large amount of energy in the form of elastic wave energy; (2) the radiation intensity at any point must not exceed the elastic limit of the ground, which at points near the surface is often very low, and (3) the methods and means used to actuate the radiator must be such as to permit very precise control of the frequency and relative phase position of the several wave trains of a group, and they must be capable of maintaining at all times very constant phase relationships between the wave trains and the recording drum. I have found that two basic methods of actuating the radiator can be made to meet these requirements, viz., (1) hydraulic methods, and (2) electrodynamic methods. In general, hydraulic methods are to be preferred when relatively low frequencies are being radiated, as for example in the region below about one hundred cycles per second, while electrodynamic methods possess certain advantages in the case of the higher frequencies. The following illustrative discussions are based on the use of electrodynamic methods of actuating the radiators.

Figures 9, 10:
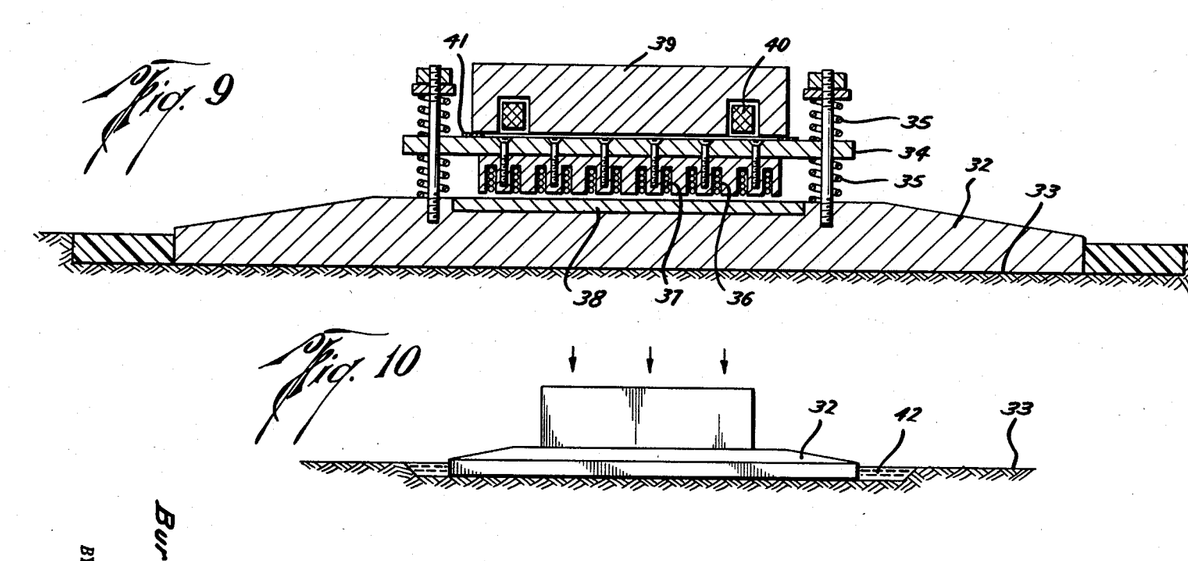
FIG. 9 is a vertical section through a seismic radiator that is particularly suited for carrying out my invention.
FIGS. 10 and 11 are elevations of set radiators, partly in section, illustrating means whereby an effective acoustic coupling between the seismic radiator and the ground can be maintained.

FIGURE 9 illustrates in vertical section a general type of transducer or seismic radiator that I have found to be particularly effective. Here, 32 is a vibrating mechanical element in the form of a relatively large plate which serves as the radiator of the seismic waves. It must be maintained in good acoustic coupling with the ground 33, a condition that can be met in practice by means described later. The radiating member 32 is elastically coupled to an inertia member 34, which may serve also as an electromagnetic element. This elastic coupling may be provided by springs 35, here shown in helical form, which can serve the double purpose of holding the radiator 32 and the inertia element 34 in the proper relative positions and also of producing an elastic coupling of sufficient rigidity to give the system, when coupled to the ground, a desired natural frequency. I prefer that the natural frequency of the radiator be substantially the same as the frequency of the wave train being radiated. Slots 36 in the electromagnetic inertia member 34 accommodate coils 37 through which alternating current is passed to stimulate the vibration of the radiator. The material of the magnetic element 34 should, preferably, be laminated to exclude eddy currents. A laminated magnetic armature 38, fastened to the radiator element 32, completes the magnetic circuit. The springs 35 normally hold the magnetic element 34 and the armature 38 apart by a distance in excess of the normal amplitude of vibration of the inertia member, so that in operation the two members will never come into contact.

In operation of the radiator, an alternating electric current, preferably of sinusoidal form, is sent through the coils 37. Since the electrodynamic force is proportional to the square of the magnetic field strength, the radiator 32 vibrates at a frequency double that of the alternating current. In general, this alternating current will be applied in the form of a truncated wave train of the type illustrated in FIG. 1, the number of cycles used being determined by considerations discussed elsewhere in this specification.

Since my inventon involves the radiation of a plurality of frequencies at each setup, and since, as mentioned above, the natural frequency of the radiator should be substantially the same as the frequency being radiated to promote high radiation efficiency, it is desirable to so design the radiator system that its natural frequency can be changed easily and quickly. This can be best accomplished by making the inertia member 34 of FIG. 9 in multiple parts separable from each other. Typical of this is the auxiliary mass 39, which is fastened to the electromagnetic member proper 34. For convenient and rapid operation I prefer to use a magnetic coupling between the auxiliary mass 39 and the magnetic member 34. Coils 40 connected to any conventional source of direct current, provide the magnetism required. I prefer to use thin, non-magnetic spacers 41 between the auxiliary mass 39 and the element 34. This insures that on removing the current from coils 40 the magnetism will be quickly reduced to zero, thus making it easy to remove the auxiliary mass 39 when higher frequencies are desired. As a rule, I provide several of the auxiliary masses of different magnitude so that several discrete frequencies can be efficiently radiated from a single radiator.

Figure 11:
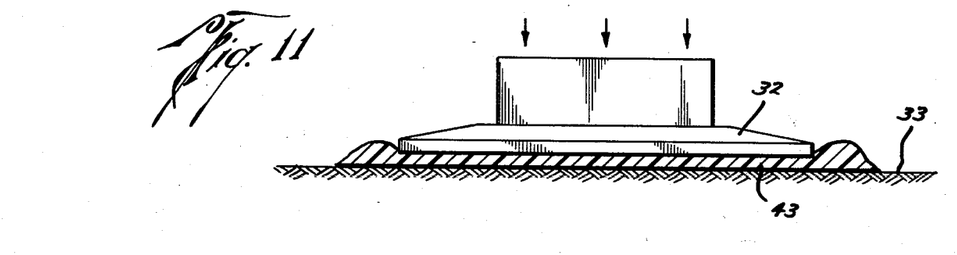

As pointed out above, it is necessary at all times to maintain good acoustic coupling between the radiator and the ground. The use of anchors for this purpose has failed to give consistent and efficient coupling, and is entirely impractical on economic grounds in rocky areas. The method of keeping the radiator firmly in contact with the ground by the use of heavy weights can be made effective, but is extremely cumbersome. In practical operations it is usually desirable to use pulsating forces as high as fifty tons or more, and the weights would have to exceed this value in order always to be effective. Since the equipment must be portable, this method is entirely impractical. I have found that an effective coupling can be maintained under all practical conditions by the use of the principle of suction. This method is illustrated in FIGS. 10 and 11. FIG. 10 illustrates a procedure which can be used in clay soils or, in general, in any area in which water seeps away only slowly. The surface is made thoroughly wet and plastic, and the radiator element 32 is set in this plastic mud, a slight depression as illustrated in FIG. 10 being sometimes desirable. I have found this simple procedure to be very effective. It will maintain effective acoustic coupling with the ground under any vibratory force that does not exceed the total atmospheric suction on the radiator element. Since atmospheric pressure at moderate elevations amounts to around 2000 pounds per square foot, a radiator only five feet square can be subjected to vibratory forces up to 50,000 pounds without loss of effective acoustic coupling. When it is desired to separate the radiator from the ground it is only necessary to apply a slow, steady lifting force at or near one side of the radiator plate to bring about a quick release. Usually, only a few seconds are required for this. However, in operation where the vibratory forces have a frequency of a hundred cycles per second or more, there is no appreciable release of the suction, so that the coupling remains essentially perfect. If the surface of the ground is porous, as in sandy areas where water drains away quickly, I use a plastic fluid instead of water. Water mixed with a small amount of clay or any other colloidal material is satisfactory. A commercial product known as Aquagel, and by other trade names, is particularly effective. In rocky areas, or any place where it is inconvenient to make a depression or a natural plastic mud, I have found this synthetic plastic mud technique very effective. A layer of the plastic mud 43 is spread over the surface on an area somewhat larger than the radiator, and the radiator plate immersed in this plastic as illustrated in FIG. 11. These techniques have been found to yield a cheap and effective solution of the problem of maintaining an effective acoustic coupling between the radiator element and the ground under virtually all terrain conditions.

*Wave train generation*

Figure 12:
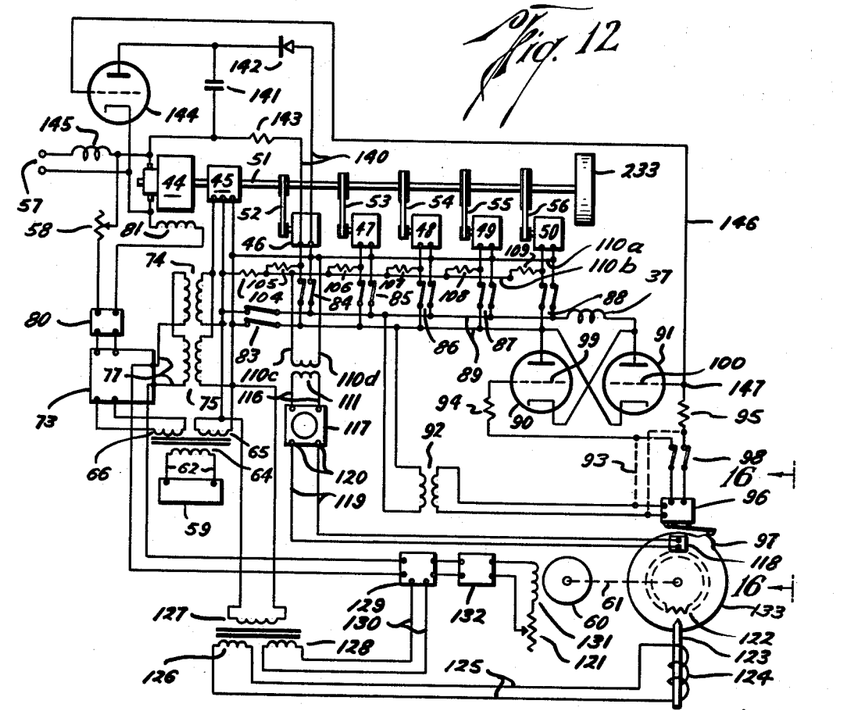
FIG. 12 is a diagrammatic representation of exemplary radiation and recording apparatus embodying the invention.

We will now consider the problem of generating the plurality of frequencies required to activate the seismic radiator. In principle, this can be accomplished by using a single generator and driving it at different speeds. However, because of the need of extremely precise control of both the frequency and phase of the current, I prefer to use a plurality of alternators, one for each frequency, the alternators being preferably all connected to a common driving motor. Such a combination is illustrated in FIG. 12, which also illustrates other means and methods that cooperate in the accomplishment of my invention. Here, 44 is the driving motor coupled to the several alternators 45, 46, 47, 48, 49, and 50 through the shaft 51 and the indirect couplings 52, 53, 54, 55 and 56. Each of these couplings must be designed to give the proper speed to the alternator which it drives, and it must also be of a type that always maintains a fixed speed and phase relationship between the driving motor and the driven alternator. Well known conventional types of drive are available for this purpose. Each of these alternators may be coupled to a radiator, preferably one having twice the natural frequency of the alternator to which it is connected. We may provide a different radiator for each different frequency or we may use a single radiator and change its natural frequency to match that being radiated. This can readily be accomplished by changing the mass of the inertia element, as described above in reference to FIG. 9. In the disclosure that follows it is assumed for simplicity that a single radiator is used.

*Synchronization*

In the application of my invention certain control elements are vital to successful operations. In general, for reasons described elsewhere in this specification, it is necessary to radiate a plurality of wave trains of different frequencies, and very precise phase relationships, and these must be repeated sequentially many times, always with very precise phase control. For best results, this phase control must be accurate to within a fraction of a millisecond. This requires that both the radiated signals and the recorder means be held in exact synchronism, and in a precise phase relationship, with a degree of accuracy far greater than is commonly required in conventional geophysical recording processes. Not only must the recorder and alternator be kept in synchronism, but any tendency toward the phenomenon of hunting, which is always present to a degree in any synchronized group, must be kept at a very low minimum. It is common practice to control the speed of a recorder by means of a tuning fork or related precise timing device. In this case we must also keep the group of alternators in synchronism with the recorder and reduce hunting and other causes of phase displacement to virtually zero. In addition, provision must be made for precise timing of the several wave trains, as described above in reference to FIG. 7.

The simplest method of insuring exact speed and phase relationship between the alternator group and the recorder drum would be to couple them directly together by fixed ratio mechanical drives. This can be done but it is usually better, for a variety of reasons, to mount the recorder and power plant on separate transportation units. Also, it will often be desirable to operate the recorder when the power plant is shut down. For these reasons it is usually better to use separate drives, so designed that they will always assure proper speed and phase relationships. There are numerous ways of accomplishing this objective, some well known and some novel, and any such means is to be regarded as an essential element of a combination embracing my invention. I have devised a novel method of achieving this objective that has proven much more effective and reliable than any other, and this method is hereinbelow described as an important element of my invention.

Figure 16:
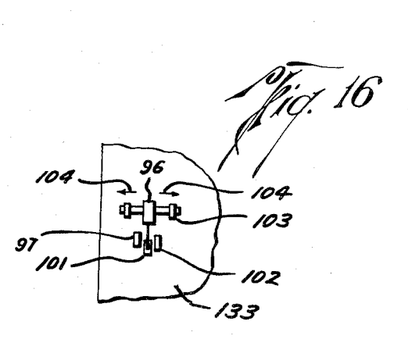
FIG. 16 is a schematic representation of a detail viewed substantially from line 16—16 of FIG. 12.

In order to explain the means and methods for achieving the above listed objectives, reference is made to FIG. 12. Here a direct current motor 44 drives the several alternators 45 to 50. The motor 44 can be driven from any suitable source of direct current 57. A rheostat 58 is provided for manual adjustment of speed, such as may be required in starting operations or otherwise. Speed control is achieved through the use of a conventional reference or datum source of very constant alternating current 59 which may, for example, be a fork controlled oscillator. This control frequency is used to control the speed of both the motor 44 and another direct current motor 60 which drives the recorder 133 through an invariant coupling 61. To accomplish the necessary speed controls, voltage from the source 59 is conveyed by the wires 62 to one coil 64 of a three-coil transformer, optionally through an amplifier. A second coil 65 of this transformer is connected to one phase of the three phase alternator 45, preferably the same phase that supplies power to activate the seismic radiator, the phasing being such that when the speed and phase relations between the alternator 45 and the control oscillator 59 are correct the magnetizing forces of the coils 64 and 65 are in opposition. The currents in the two coils are adjusted to approximate equality so that the resultant magnetizing force will be very small compared to that produced by either coil separately. A third coil 66 mounted on the speed by the motor 44, and that the recording drum 133 and the alternator are held in exact synchronism, as above described. A group of switching devices 83, 84, 85, 86, 87, and 88 are provided whereby any alternator can be connected individually to the bus bars 89 and to two thyratrons 90 and 91. Let us assume that the switch 83 is closed, thereby connecting the alternator 45 to the bus bars 89, the other switches remaining open. An alternating voltage will be then be impressed on the circuit comrised of the coil 37 which symbolizes the exciting coil on the radiator, but with the thyratrons 90 and 91 barring any current flow except under certain conditions, such that the seismic radiator coil 37 will be energized only at the precise points in the Fourier cycle as disclosed in the foregoing analysis. These conditions can be realized in a plurality of ways, a preferred method being the following. A conventional peaking transformer 92 has its primary connected across the bus bars 89 so that the secondary generates a quick peak impulse at the beginning of each half cycle of the alternating voltage. If the secondary of this transformer were connected through the dotted lines 93 to the grids of the thyratrons 90 and 91, one of these would be fired at the beginning of one half cycle and the other would be fired at the beginning of the next half cycle, thereby sending an alternating current through the coil 37, and this would continue as long as the circuit through the dotted lines 93 is closed. The thyratron hookup here shown is conventional and its operation well understood by those skilled in the electrical arts. It is evident that this excitation of the radiator coil 37 can be stopped at any time by simply opening the circuit of the dotted lines 93. This is very easy to do since they need to carry only grid currents that are limited by the resistors 94 and 95 to virtually negligible values. In order to control the excitation of the radiator coil automatically, we eliminate the circuit of the dotted lines 93 and route the circuit through the switch 96 which is normally open, but is closed at a precise predetermined point in each revolution of the recorder drum by the cam 97. Optionally, an electrical contacting device or other well known relaying techniques may be substituted for the cam 97. If the manual switch 98 be closed, then the voltage of the secondary of the transformer 92 will be impressed on the grids 99 and 100 for a very brief period each revolution of the recording drum, and during this period the seismic radiator will be continuously energized. Obviously, the beginning of the wave trains can be determined by the angular position of the cam 97 on the drum 133, while the duration of the period of excitation will be determined by the tangential length of the cam. The excitation of the radiator can be stopped at any time by opening the manual switch 98. Therefore, when it is desired to radiate a series of sequential wave trains for the making of a composite record as hereinabove described, it is only necessary to close the manual switch 98, whereupon there will be radiated a truncated wave train once each revolution of the recorder drum. After the requisite number of such trains have been recorded to give the desired composite, the switch 98 is opened and the operation ceases. This operation completes a series of seismic waves for a single frequency. The next step is to open switch 83 and close switch 84 to excite the radiator with a different frequency, but before starting the operation it is necessary to make an adjustment in the cam 97 because, as pointed out above and shown in FIG. 2, the starting point of the several trains of different frequency will begin and end at times slightly different from each other. This can best be done by using a plurality of cams, one for each frequency, and shifting the switch 96 sequentially to the proper cam for each frequency (FIG. 16). Each cam is adjusted once for all in its tangential position and length to give the proper starting and terminal times for the particular frequency for which it is adapted. FIG. 16 shows an elevation of a cam assembly designed to perform these functions. Here the several cams 97, 101, 102, etc., are arranged side by side on a suitable part of the recorder drum 133 or on some part coupled thereto. The switch 96 is on an adjustable mount 103 that is capable of lateral movement in either direction as indicated by the arrows 104, so that it can be made operative by any desired cam. This procedure is repeated with switches 84, 85, etc., closed sequentially, until suitable composites have been made of all of the several frequencies desired.

As repeatedly pointed out above, it is essential to maintain very precise time phase relations between the recorder and the Fourier cycle hereinabove disclosed. This consideration becomes of prime importance when we come to consider the means and methods for driving the recorder. In particular, it was shown above in reference to FIG. 2 that the timing of the radiations must be related in a very precise way to the pattern of the Fourier cycle, the actual timing of the several frequencies being, preferably, at the points 26 to 31, inclusive, where the several trains pass through zero values. Suppose, now, we have all of the equipment operating with adjustments made to time the radiations at the proper points in the Fourier cycle. If, now, the recorder should slip one cycle or more of its control current, the cam group 97, 101, 102, etc., would then start the radiation either earlier or later than desired. The amount of this shift in time will always be equal to the duration of the particular number of cycles through which the drum slipped. It is necessary therefore to have some dependable indicator as to whether the drum is locked in synchronism with its control frequency in the particular phase relationship required. This may be accomplished in a variety of ways, a preferred means being described below.

We first set arbitrarily the time point, 26 (FIG. 2) for example, at which some one of the trains is to be started. Since this point is always spaced a definite time interval from the event 9 of FIG. 2, we can use this event as one element of an indicator of proper timing and can then use an indicator on the recorder as the other element. To do this we bring leads 110a and 110b from all of the alternators, before switches 83, 84, etc., preferably through current limiting resistors 104, 105, 106, 107, 108, and 109, and the common leads 110c and 110d to the primary of a transformer 111. The output of the secondary coil of this transformer will be a composite of these several wave trains which will, of course, be the function represented by the composite curve of FIG. 8, of which event 9 is a recurring element. Preferably, I convey the output of transformer 111 through the leads 116 to one input of a twin trace oscilloscope 117. To complete the indicator we mount on the recorder drum a signalling device 118 of FIG. 12, which may be an electrical contact, an inductive element, or other device that gives an electrical signal as that particular part of the drum passes a predetermined point. The output of this device is conveyed by the wires 119 to the other terminals 120 of the twin trace oscilloscope 117, where it may be compared visually with the signal derived from transformer 111 to show the relative time of occurrence of the two separate events. The device 118 is adjusted once for all so that when the timing of the radiated wave trains is correct the two signals here provided will bear a definite and easily recognizable relationship to each other, the most desirable such relationships being that of exact time coincidence between key events of the two signals.

Figure 13:
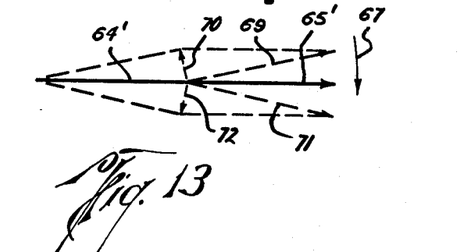
FIGS. 13 and 14 are vector diagrams that illustrate important means of maintaining proper speed and phase control.

When the above described indicating device shows that the drum is not in proper phase position for correct timing of the wave trains it is necessary to make proper corrections. In order to do this it is necessary to use a type of drive for the recorder that not only tends to keep it in synchronism, but which is amenable to manual adjustment. Conventional types of synchronous motors are not suitable for this. I prefer to use a drive identical in principle with that described above for automatically controlling the motor 44 that drives the alternators, namely, a direct current motor 60 controlled in the same manner same core will normally have induced in it only a negligible voltage. If, however, a slight phase difference should develop between the currents in the two coils 64 and 65, a large voltage will be generated in the coil 66. This is illustrated in FIG. 13, which is a conventional vector diagram with rotation assumed clockwise as indicated by the arrow 67. The vector 64' represents the voltage impressed on the transformer coil 64 from the source 59, and the vector 65' represents the voltage impressed on the coil 65 by the alternator 45. Since, as stated above, these two voltages are substantially equal, there will be virtually no magnetic flux linked with the coil 66 when 64 and 65 are in opposite phase, which is the normal operating relationship. If, however, any slight difference in phase should develop, as for example if the alternator 45 should tend to slow down, the vector 65' will shift counterclockwise to the position indicated by the dotted vector 69. When this occurs, a comparatively large resultant voltage 70 will be generated in the third coil 66. It will be seen that this resultant voltage is substantially in quadrature with the voltages 64' and 65'. Conversely, if the alternator 45 should tend to speed up, the vector 65' will shift clockwise to the position shown by the dashed vector 71, and the resultant voltage 72, virtually opposite in phase from the resultant 70, will develop. It will thus be seen that the resultant voltages 70 and 72 will be definite and very sensitive indicators of any deviation from the normal speed and phase relationships between the alternator 45 and the datum alternator 59. They can also be effectively utilized to provide automatic controls to detect and prevent any important deviation from the normal conditions. They will hereinafter be referred to as the control voltages. This control can be accomplished as described below.

Figure 14:
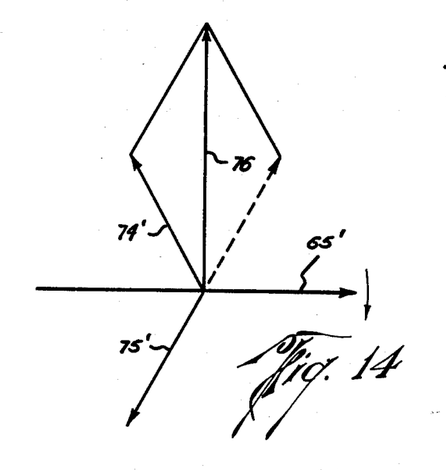
Figure 15A:
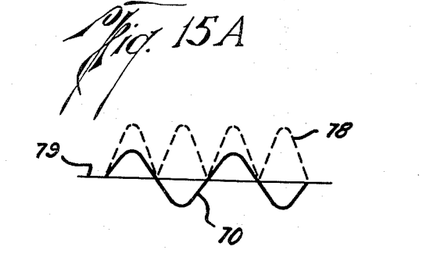
FIGS. 15A, 15B and 15C are wave diagrams illustrating an important step in the method of speed and phase control of the radiating apparatus.
Figure 15B:
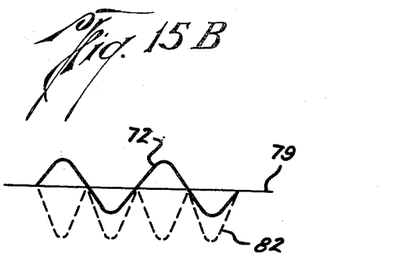
Figure 15C:
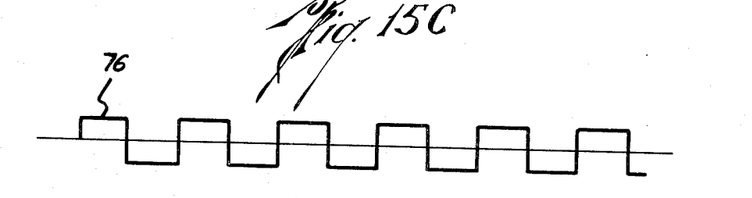

The necessary control condition to be established is that when the control voltage lags, as at 70, there will be set up a tendency for the speed of the motor 44 to increase, and conversely, if the control voltage leads as at 72, the speed of the motor will be reduced. This will provide a condition of complete stability with the voltages 64' and 65' being held in close opposite phase relationship, which in turn will insure the proper phase relationship between the alternator 45 and the datum alternator. In order to establish this control, we may use any of a number of electrical circuits. Preferably, we connect the coil 66 to one input of an analog multiplying device 73, where it is multiplied by a cooperative voltage function derived as described below. This analog multiplier may be of conventional design well known to those skilled in the analog computer art. In order to derive the cooperative voltage function, we connect to the three terminals of the three phase alternator 45 the two transformers 74 and 75, thereby yielding on their outputs the voltages 74' and 75' shown in the vector diagram of FIG. 14, the third voltage of the three phase alternator being 65', the voltage used to supply power to the seismic radiator. If, now, we reverse the phase of vector 75' and combine it with voltage 74' by properly connecting the secondaries of the transformers 74 and 75, we get the vector 76 which, as will be seen, is substantially in quadrature with vector 65', this puts the vector 76 approximately in phase with the resultant vector 70 of FIG. 13, which is one of the voltages used to govern the automatic control of speed and phase. The voltage represented by the vector 76 is the cooperative voltage referred to above as needed to complete the control function. This voltage is conveyed by the wires 77 of FIG. 12 to a second input of the analog multiplier 73 in which it is multiplied by the control voltage 70 derived from the coil 66, as above explained. The result of this multiplication is shown in FIG. 15C. Here, the cooperative multiplier voltage 76, preferably after conversion to a square wave by well known means, is plotted alongside segments of the control voltage 70 (FIG. 15A), in phase with 76, and the control voltage 72 (FIG. 15B), which is opposite in phase to the cooperative multiplier 76, as was shown above to be the case. Optionally, the cooperative voltage 76 may be used as a sine wave. The output of the analog multiplier 73 will be the product of the voltage 76 and whichever control voltage is acting. If the motor 44 tends to slow down the control voltage 70 comes into play, in which case it will be seen that the product plotted as the dotted curve 78 will be a pulsating unidirectional voltage on the positive side of the zero line 79, because the two voltages 70 and 76 are virtually in phase. This voltage 78 is conveyed to the speed control element of the motive power which drives the alterantor. In general, this can be accomplished by providing that the rectified control voltage 78 may control the power supply to the motor. If this motor be a prime mover, the control voltage may control a servo mechanism such as a solenoid to operate the throttle, thereby controlling the speed. I prefer, however, to use a direct current motor to drive the alternator. In this case the rectified control voltage 78 is conveyed, optionally through a direct current amplifier 80, to the field circuit 81 of the direct current motor 44 of FIG. 12, the connections being such that this voltage reduces the value of the field current. This in turns tends to increase the speed of the motor, thereby correcting the tendency that brought the control voltage 70 into action, which is the object sought. If, on the contrary, the motor 44 should develop a tendency to speed up, the vector diagram of FIG. 13 shows that control voltage 72 is brought into play, but since this voltage is opposite in phase from the cooperative multiplier voltage 76 the product 82 will be a unidirectional voltage on the negative side of the zero line. This negative component of unidirectional voltage is now impressed on the field circuit 81 in a direction that increases the field current, thereby tending to reduce the speed of the motor 44. It will thus be evident that the automatic control system above described establishes a condition of inherent stability and maintains a constant phase relationship within very narrow limits between the alternator 45 and the constant frequency control source 59.

Superficially it might appear that the recorder 133 could be driven by a synchronous motor powered by the constant frequency source 59. However, as will presently appear, it will often be necessary, as when starting an operation, to exercise manual control of the speed and phase position of the recorder drum. This is best accomplished by driving the recorder by a direct current motor in the same manner as described above for controlling the speed and phase position of the alternators. The same constant frequency source 59 can be used for this, but the control voltages must be derived from an alternating current generator driven by the recorder drum 133. The details of this will be described later after other important factors have been introduced.

There will next be described the means and methods whereby a group of wave trains can be generated to meet the specifications set out above. First we must adjust the relative angular positions of the alternators 45 to 50 inclusive, so that they will generate wave trains that have the characteristics required. From a knowledge of the design of the alternators it is a simple matter to so adjust their relative angular positions that there will be a close approximation to a common point at peak of a wave in each train, which is one of the requirements set out above. Then by making proper observations of the output of the alternators, as by means of an oscilloscope or by photography, any displacements from the desired position can be readily detected and adjustments made. Assuming that this adjustment has been made, we proceed to describe how the wave trains can be generated. Referring to FIG. 12, we assume that the alternator 45, which may be taken as the base frequency alternator, is being driven at proper as provided above for motor 44. In this case, however, the control voltage is derived from the resultant of combining a voltage from either the alternator 45, as shown in FIG. 12, or the constant frequency source 59 with a voltage derived from an alternator coupled in definite relationship to the recorder drum. This voltage can be derived by mounting on the recorder drum an inductor in the form of a toothed magnetic disc 122. Cooperating with this toothed disc is a magnetic core 123 carrying a coil 124 in which there is induced an alternating voltage having a frequency and phase position definitely related to the speed and phase position of the recorder drum. The output of this alternating current generator is conveyed through the leads 125 to a coil 126 of a three-coil transformer, where it is combined with a voltage from the alternator 45 in the coil 127 to give in coil 128 a resultant voltage in exactly the same manner as described above in reference to FIG. 13 for control of the speed and phase of the alternator 45. We can here use the same cooperative voltage function 76 of FIG. 14, which is conveyed to an analog computer 129 by the wires 130 to provide, through the multiplier, the necessary unidirectional voltages for automatically controlling the speed and phase position of the motor 60 through its field circuit 131, in the same way as described above for controlling the motor 44. Optionally, the field control current may be passed through a D.C. amplifier 132.

If at any time the phase indicator above described should show that the phase relationship between the alternators and the recorder drum is not proper for exact timing of the radiations relative to the recorder position, the speed of the motor 60 is adjusted slightly by the field resistance 121 until the indicator shows that the correct phase relationship is established.

Figure 17:
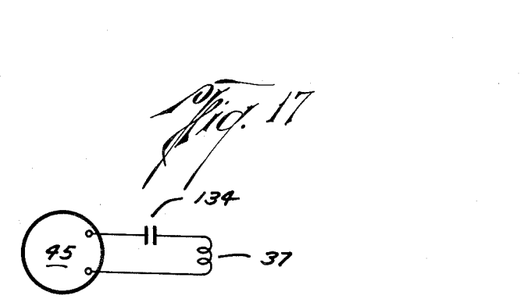
FIG. 17 illustrates the means for counteracting inductive reactance in the radiator energizing circuitry.

In the case of a seismic radiator designed in conformity with the principle above set out, the coils 37 will inevitably have a reactance that is high compared to their resistance, particularly at the frequencies here contemplated. It is well known that any electrical device having an impedance that is high compared to its resistance will require a substantially higher voltage for a given current flow than a similar device that is virtually non-inductive. Further, it is well known that when an alternator is called on to supply power to an inductive circuit the resulting lagging current flowing in the armature coils will produce a demagnetizing effect on the field of the alternator, thereby substantially lowering its voltage. For both of these reasons a much larger alternator will be required than would be needed if the circuit were non-inductive. I overcome this handicap by connecting permanently, in series with each alternator, a condenser 134 of FIG. 17. This condenser should have a negative reactance substantially equal to the combined inductive reactance of both the radiator and the alternator. With the use of this device a much smaller and cheaper alternator can be used.

Figure 18:
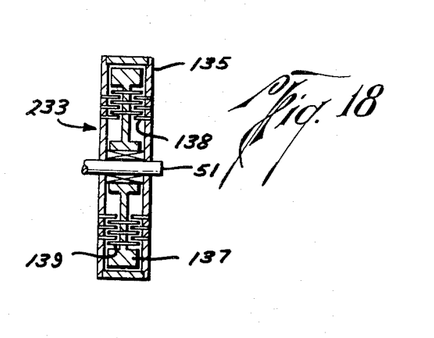
FIG. 18 is an enlarged radial section through the flywheel of FIG. 12.

Because of the intermittent character of the load, which is very large during the brief period during which the radiator is being actuated, it is desirable to provide a momentary source of power to supply this sudden transient demand in order to prevent undesirable changes in speed and phase. One method of supplying this transient demand for power is through the use of a flywheel, and this method can be made practical by means and methods described later. Such a fly wheel is illustrated in principle at 233 in FIG. 12 and in FIG. 18. I have also devised a preferred method whereby a momentary supply of electric power is delivered to the armature of the motor 44 during the brief period during which energy is being radiated. This method is also described later in this specification.

It was pointed out above that all synchronously operated groups have a tendency to hunt, and this tendency may often develop to such an extent that serious phase differences between the alternators and the recording drum may occur. This tendency is greatly increased by the use of a large flywheel, since this greatly increases the stored energy of any given oscillation that may be superposed on the steady rotation. In the operation here considered it is very desirable to use a flywheel of considerable mass to provide most of the power required during the very brief interval while the radiator is being excited. The use of such a flywheel materially reduces the phase displacement that would otherwise occur when the heavy momentary load is thrown on the alternators, and it also makes possible the use of much smaller alternators and a smaller driving motor. The one disadvantage is the tendency of such a flywheel to aggravate hunting. I have found that this difficulty can be overcome by the use of a self-damped flywheel. Such damping can be secured by so designing the flywheel that any deviation from uniform angular velocity will cause absorption of energy, and the greater this absorption the more effectively will any oscillations of the entire rotating system be damped out. It is possible to damp a flywheel by any design which provides two elements movable rotationally with respect to each other, and of such design that any such relative rotative movement will absorb energy. This can be accomplished either electromagnetically or hydraulically, but I prefer the hydraulic method. A flywheel that I have found particularly effective for suppressing hunting or other phase displacements is illustrated in vertical section in FIG. 18. Here, the flywheel comprises an outer housing 135, which is fixed to the rotating shaft 51. This housing is hermetically sealed to hold liquids without leakage. Inside this housing is a floating element 137, which floats freely on the shaft 51. This floating element should preferably contain the greater part of the total mass of the flywheel. The space between the housing 135 and the floating member 137 is partly or wholly filled with a viscous fluid, the viscosity required depending on the design. I prefer to mount on the inner faces of the housing 135 projecting parts 138, which may be rods or bars of any suitable shape. Similar projecting parts 139 are mounted on the floating member 137. These two groups of projecting parts will perform no function when the floating member 137 is rotating at exactly the same speed as the housing 135, as will be the case as long as the speed is perfectly uniform. If, however, there be set up any relative motion between these parts, due to any slight momentary change of speed, the projecting elements will set up eddy currents in the viscous fluid inside the housing and the energy dissipation resulting will quickly terminate any relative movement that may be set up. This type of flywheel is particularly valuable as a prevention device, for I have found that a flywheel of this type, when properly designed and when combined with the automatic phase control means hereinabove described, will virtually prevent the incidence of any appreciable relative motion between the housing and the floating element. This assures steady velocity and freedom from objectionable phase shifts.

The methods disclosed above provide means for countering the sudden changes in speed and phase resulting from a number of variable factors, particularly the sudden demand for power during the period when energy is being radiated. I have found, however, that large and expensive motors and flywheels are necessary to hold the change of speed and phase within permissible limits. I can accomplish the desired objectives much more simply and cheaply by providing means for delivering to the motor 44 a momentary supply of electric power during the brief period when energy is being radiated. The means whereby I accomplish this are disclosed in reference to FIG. 12. Leads 140, from any suitable source of electric power which may be ony one of the alternators, as 46 for example, are connected to a condenser 141, through a rectifying device 142 and a current limiting resistance 143. This tends to keep the condenser continuously charged. A thyratron 144 is provided whereby, on a predetermined signal, the condenser 141 is discharged through the armature of the motor 44, thus enabling the motor to deliver momentarily the additional supply of power required during radiation of energy. A choke 145, of low resistance and high inductance, prevents any appreciable portion of the discharge from bypassing the motor 44 through the power supply circuit 57. In order to supply this extra power to the motor 44 at the proper time, the grid of thyratron 144 is connected by a wire 146 to some point in the radiation control circuit such as 147. It will be seen that whenever the thyratron grid 100 is being energized during the period of radiation the thyratron 144 will also be fired, thereby accomplishing the object sought.

In the detailed description of the radiation control techniques hereinabove set forth, it was assumed for simplicity that only one wave train would be radiated at any time. However, from the standpoint of speed and economy substantial advantages may be derived by radiating simultaneously a plurality of wave trains, each by a separate radiator designed to radiate most efficiently at a specific frequency, and excited by an alternator of one half that frequency, as above described. This involves no change in the control techniques as above set out. The common bus bars 89 are dispensed with and each alternator is connected directly, through a separate pair of thyratrons, to its particular radiator, each being controlled by a separate control switch, such as 96 of FIG. 16. Obviously, for multiple radiation there will be as many of these control switches as there are radiators in simultaneous operation. No modification of the detecting and recording apparatus, cam structures 97, 101, 102, etc., is required. It is assumed, of course, that the amplitudes, phasing, and timing of the recorded wave trains will be such as to synchronously reproduce the same Fourier function after algebraic integration, consisting of a single prominence, as would result from such integration, as described, of the wave trains as radiated. Means for correcting timing, phasing, and amplification of the detected wave trains to compensate for observed distortions caused by the media (earth and instrumentation) through which the radiated and reflected wave energy travel are well-known to those skilled in seismographic art and will be utilized as needed to obtain the novel and highly advantageous results as hereinabove described.

Varous other modifications may be made, as will occur to those skilled in the art and the exclusive use of all modifications as come within the scope of the appended clams is contemplated.

I claim:

1. The method of seismic prospecting which comprises the steps of individually radiating in the earth a group of truncated wave trains each of controlled amplitude and number of cycles and of fixed frequency differing from the frequencies of all others of the group by values of an arithmetical series, detecting the radiated signals at one or more points on the earth spaced from the radiating location and recording the detected signals on a cyclically moving recorder in overlapping relationship and timed so that said trains as recorded will be substantially in phase with each other at a single wave crest of each so as to present a brief marker while substantially suppressing the remainder of the trains by mutual cancellation.

2. The method of seismic prospecting to discriminate between reflections of the same signal between closely-spaced, subsurface horizons comprising the steps of individually radiating in the earth a group of truncated wave trains each of controlled amplitude and number of cycles and of fixed frequency differing from the frequencies of all others of the group by values of an arithmetical series, detecting the radiated signals at a location on the earth spaced from the radiating point and translating the detected signals into analogous electrical currents, passing said currents through resonant filters tuned respectively to said frequencies, and recording the detected and filtered signals in visible wave form on a cyclically moving recorder in such overlapping and timed relationship that all of said filtered trains will be in phase only at said single mid-point to form a brief prominence in definite timed relationship with said trains.

3. The method of seismic prospecting described in claim 2 in which the durations of the radiated wave trains are slightly less than one-half the cycle of the composited Fourier function and the recorded wave trains do not exceed the period of the recorder or a submultiple thereof.

4. The method of seismic prospecting comprising individually and simultaneously radiating in the earth a plurality of wave trains each of controlled amplitude and duration and of uniform frequency differing from the frequency of all the others by values of an arithmetic progression and timed so that all of said trains are in phase at single wave crest of each substantially at the end thereof, detecting reflections of said wave trains from subsurface horizons, recording and algebraically compositing the detected reflections on a cyclical recorder, sensing the relative amplitudes, timing, and phasing of the detected wave energy, and correcting the timing and phasing of said detected wave energy in order to maintain the recorded wave trains in the same timing and phase relationship as said radiated wave trains and thereby produce on the final record an isolated brief wave prominence and substantially suppress the remainders of the trains by algebraic cancellation.

References Cited by the Examiner

UNITED STATES PATENTS

| | | | |
|---|---|---|---|
| 1,271,362 | 7/18 | Rainey | 74—574 |
| 1,604,693 | 10/26 | Hecht et al. | 340—8 |
| 1,906,925 | 5/33 | Edwards | 74—574 |
| 2,235,089 | 3/41 | Sparks | 181—0.5 |
| 2,281,751 | 5/42 | Cloud | 181—0.5 |
| 2,320,248 | 5/43 | Shimek | 181—0.5 |
| 2,364,209 | 12/44 | Green | 181—0.5 |
| 2,521,130 | 9/50 | Scherbatskoy | 181—0.5 |
| 2,530,971 | 11/50 | Kean | 181—0.5 |
| 2,657,380 | 10/53 | Donaldson | 181—0.5 |
| 2,702,472 | 2/55 | Rabinow | 181—0.5 |
| 2,745,507 | 5/56 | Bodine | 181—0.5 |
| 2,772,746 | 12/56 | Merten | 181—0.5 |
| 2,778,002 | 1/57 | Howry | 181—0.5 |
| 2,910,134 | 10/59 | Crawford et al. | 181—0.5 |
| 2,926,739 | 3/60 | Shoemaker | 181—0.5 |
| 2,981,928 | 4/61 | Crawford | 340—15 |
| 3,020,970 | 2/62 | Hasbrook | 181—0.5 |
| 3,022,851 | 2/62 | Hasbrook | 181—0.5 |
| 3,066,754 | 12/62 | Johnson | 181—0.5 |

SAMUEL FEINBERG, *Primary Examiner.*

CHESTER L. JUSTUS, C. W. ROBINSON, *Examiners.*